US010156690B2

(12) United States Patent
Coppieters et al.

(10) Patent No.: US 10,156,690 B2
(45) Date of Patent: Dec. 18, 2018

(54) FIBER CONNECTION ASSEMBLY

(71) Applicant: GENEXIS HOLDING B.V., Eindhoven (NL)

(72) Inventors: Stijn Eeltje Franciscus Coppieters, Breda (NL); Gerard Nicolaas Van Den Hoven, Maria Hoop (NL); Alexander Jacobus Hins, Wijchen (NL); Maurice Martinus De Laat, Soerendonk (NL); Tom Paulus Maria Van Den Hout, Eindhoven (NL)

(73) Assignee: GENEXIS HOLDING B.V., Eindhoven (NL)

( * ) Notice: Subject to any disclaimer, the term of this patent is extended or adjusted under 35 U.S.C. 154(b) by 0 days.

(21) Appl. No.: 15/549,368

(22) PCT Filed: Nov. 25, 2015

(86) PCT No.: PCT/EP2015/077620
§ 371 (c)(1),
(2) Date: Aug. 7, 2017

(87) PCT Pub. No.: WO2016/128083
PCT Pub. Date: Aug. 18, 2016

(65) Prior Publication Data
US 2018/0024305 A1    Jan. 25, 2018

(30) Foreign Application Priority Data

Feb. 9, 2015   (NL) ...................................... 2014263

(51) Int. Cl.
*G02B 6/44*    (2006.01)
*G02B 6/38*    (2006.01)

(52) U.S. Cl.
CPC .......... *G02B 6/4447* (2013.01); *G02B 6/4466* (2013.01); *G02B 6/4471* (2013.01); *G02B 6/3897* (2013.01); *G02B 6/4472* (2013.01)

(58) Field of Classification Search
CPC .. G02B 6/4447; G02B 6/4466; G02B 6/4471; G02B 6/3897; G02B 6/4472
See application file for complete search history.

(56) References Cited

U.S. PATENT DOCUMENTS 4,217,030 A * 8/1980 Howarth .............. G02B 6/3841
                                                              385/59
4,595,251 A * 6/1986 Moulin ................ G02B 6/3816
                                                             439/289

(Continued)

FOREIGN PATENT DOCUMENTS

CN       103315064 A     10/2011
EP         0116480 A1      8/1984

(Continued)

OTHER PUBLICATIONS

International Search Report and Written Opinion for PCT Patent App. No. PCT/EP2015/077620 (dated Feb. 26, 2016).

*Primary Examiner* — Peter Radkowski
(74) *Attorney, Agent, or Firm* — Kenealy Vaidya LLP (57) ABSTRACT

A fiber connection assembly includes a first and a second coupling member. The first coupling member includes a first housing, a protrusion protruding from a first side of the first housing, and a first optical connector arranged in the protrusion. The second coupling member includes a second housing, a recess arranged at a first side of the second housing and a second optical connector arranged in the second housing in or next to the recess. The coupling members can be coupled by moving the first member relative to the second coupling member in a first direction towards and onto the second coupling member, thereby (Continued)

inserting the protrusion into the recess, and then by rotating the first coupling member relative to the second coupling member in a plane perpendicular to the first direction and around a rotation axis until the first optical connector is connected to the second optical connector.

12 Claims, 11 Drawing Sheets

(56) References Cited

U.S. PATENT DOCUMENTS

| | | | | |
|---|---|---|---|---|
| 5,195,125 | A * | 3/1993 | Bliven | H01R 13/443 |
| | | | | 379/29.01 |
| 5,404,401 | A * | 4/1995 | Bliven | H01R 13/443 |
| | | | | 361/641 |
| 6,334,715 | B1 * | 1/2002 | So | G02B 6/3825 |
| | | | | 385/139 |
| 8,936,489 | B2 * | 1/2015 | Liao | H01R 31/06 |
| | | | | 439/638 |
| 9,482,827 | B2 * | 11/2016 | Haase | G02B 6/3829 |
| 2006/0153516 | A1 | 7/2006 | Napiorkowski et al. | |
| 2009/0060441 | A1 | 3/2009 | Kowalczyk et al. | |
| 2009/0074369 | A1 | 3/2009 | Bolton et al. | |
| 2009/0123115 | A1 | 5/2009 | Gronvall et al. | |
| 2012/0183256 | A1 * | 7/2012 | Shao | G02B 6/4292 |
| | | | | 385/39 |
| 2013/0040471 | A1 * | 2/2013 | Gervais | F21V 23/0464 |
| | | | | 439/56 |
| 2013/0084725 | A1 * | 4/2013 | Liao | H01R 31/06 |
| | | | | 439/170 |
| 2013/0121635 | A1 * | 5/2013 | Thacker | G02B 6/26 |
| | | | | 385/15 |
| 2013/0188912 | A1 * | 7/2013 | Bimboese | G02B 6/389 |
| | | | | 385/60 |

FOREIGN PATENT DOCUMENTS

| | | | | |
|---|---|---|---|---|
| EP | 0213365 A1 | 3/1987 | | |
| EP | 1950590 A2 | 7/2008 | | |
| EP | 2573602 A1 | 3/2013 | | |
| EP | 2904440 A1 * | 8/2015 | | G02B 6/3829 |
| WO | WO 2014055226 A1 * | 4/2014 | | G02B 6/3829 |

* cited by examiner

FIBER CONNECTION ASSEMBLY

CROSS REFERENCE TO RELATED APPLICATIONS

This is a U.S. National Phase filing under 35 C.F.R. § 371 of, and claims priority to, International PCT Patent Application No.: PCT/EP2015/077620, filed on Nov. 25, 2015, which claims priority to Netherlands Patent Application No.: 2014263, filed on Feb. 9, 2015, the contents of each of which are hereby incorporated in their entireties by reference.

BACKGROUND

Some embodiments relate to a fiber connection assembly comprising a first and a second coupling member, to a coupling member for use in such an assembly and to a fiber termination unit for connecting an optical fiber to a network termination unit.

In a fiber based communication network that connects end-user premises, like fiber-to-the-home (FttH), the user premises is connected to the access network based on optical fibers. Optical fibers allow end-customers/consumers to make use of broadband services, provided by a service provider. There are different levels in the topology of the access network. The lowest level consists of the passive infrastructure and contains the cables and physical connections required to connect the end-customers to the network. Higher levels allow for the data transport using the passive infrastructure, using e.g. the Ethernet-protocol or the GPON-protocol. This allows service providers to deliver the service(s) to the end-customers (i.e. Internet, telephony, cable TV, IP-TV, and in the future services like health-care).

The passive infrastructure contains the fiber cables (and possible other components required, like splitters, filters, (de)multiplexers), which are mainly deployed in the ground or on poles. It realizes the physical connection from the so-called Central Office (CO) to the end-customer. Part of the passive infrastructure are the properly installed fibers at the end-customer premises. These fibers are typically mounted in a so-called Fiber Termination Unit (FTU). The remainder of this document will focus on the FTU and connection mechanism with the Network Termination Unit (NTU), explaining the state-of-the-art today and introduce a new concept.

Because optical fiber is delicate and because the connection of one optical fiber to another requires considerable accuracy, care must be taken when installing fiber in a user premises or home. Therefore the installation of the fiber is often performed by skilled professionals. It requires the right skills, know-how and equipment in order to get the job done.

A protective cable containing one or more optical fibers enters the home through a wall. A FTU can also be installed outside, which is common practice in the US. The cable is brought to a location convenient for installing the FTU. The FTU is often mounted on a wall. As stated above, the FTU serves as the end-point for the fiber cable coming from the outside. The FTU typically contains a means for strain relief for the protective cable, a means for storing or rolling up the fiber(s), and a connection of the optical fiber(s) in the cable to one or more optical connectors or connectorized fiber(s) (so-called pigtail(s)). This connection is often realized by using fusion splicing—melting the two glass fibers to each other. This is executed with a very high accuracy to minimize the optical loss. It should be noted that the most commonly used fiber in FttH, standard single mode fiber (e.g. G652, G657, etc.), contains the light in the inner core having a diameter of on the order of 10 micrometer. After the installation of the FTU, an optical connection point has been created, often as an optical connector or optical adapter.

When the end-customer has received a FTU in his premises and wants to start using services delivered via his fiber connection, the fiber connection needs to be activated. In the CO this means that the fiber is connected to a so-called access switch or Optical Line Terminal (OLT), equipped with an optical interface. At the customer side, a product is to be attached to the fiber that receives the optical signals and converts these in electronic signals and vice versa. This product is called a Network Termination Unit (NTU), or an Optical Network Terminator (ONT), or an Optical Network Unit (ONU), since it terminates the optical network and is the actual demarcation point between the transport network and the services that the end-user consumes.

SUMMARY

There are two ways to realize the optical connection between the NTU and the FTU: Via click-on or via patching.

For the click-on principle, the NTU need to be coupled to the FTU by way of placing the NTU onto the FTU and then sliding the NTU relative to the FTU until a connection is made between the optical connectors inside the FTU and NTU. It turns out that the correct placing of the NTU on an FTU is rather complex, since it needs to be done in an accurate manner. Furthermore, the sliding of the NTU relative to the FTU is not very easy for certain people since it is not really intuitive. Therefore this solution is not truly do-it-yourself and imposes a risk for correct installation of the NTU by the end-user.

For the patching principle, the NTU need to be coupled to the FTU by connecting an optical patch cord between NTU and FTU. An optical patch cord is very sensitive for pollution, e.g. dust. Correct connection of a patch cord is not very easy for certain people since it is not really intuitive. Therefore this solution is also not truly do-it-yourself and imposes a risk for correct installation of the NTU by the end-user.

Some embodiments are directed to a coupling mechanism between a fiber termination unit and a network termination unit which is easier to use by the end-customer.

According to a first aspect, some of the embodiments, the above is addressed or achieved by providing a fiber connection assembly including:
- a first coupling member including a first housing, a protrusion protruding from a first side of the first housing, and a first optical connector arranged in the protrusion;
- a second coupling member including a second housing, a recess arranged at a first side of the second housing and a second optical connector arranged in the second housing in or next to the recess.

The first and second coupling member are arranged to be coupled to each other by way of moving the first coupling member relative to the second coupling member in a first direction towards and onto the second coupling member, thereby inserting the protrusion into the recess, and then by rotating the first coupling member relative to the second coupling member in a plane perpendicular to the first direction and around a rotation axis until the first optical connector is connected to the second optical connector.

It is noted that first coupling member, comprising the protrusion, may be moved towards and onto the second coupling member. Alternatively, the second coupling member, comprising the recess, may be moved towards the first coupling member. In practice one of the coupling members will already be fixed to a e.g. wall before coupling, while the other coupling member will be held and moved by a user.

Rotating the first coupling member relative to the second coupling member is an easy and intuitive way of coupling. The user will know how to place the coupling members onto each other since he will understand that the protrusion needs to be inserted in the recess. From that point on the first coupling member can only be rotated in a direction that will make the connectors engage. The user will feel when to stop rotating the coupling member.

In an embodiment the protrusion and the recess are dimensioned and shaped such that the protrusion can only be inserted in one possible way into the recess. In this way, the user will not be confused as how to place the coupling members onto each other. The protrusion may have a cross section which resembles part of the cross section of the recess. The cross section of the protrusion may have an at least partly curved circumference, parts of which matching at least a part of a curved circumference of the cross section of the recess.

In an embodiment once the protrusion is inserted into the recess, the first coupling member and the second coupling member can be rotated but not translated relative to each other in the plane perpendicular to the first direction. To achieve this, the recess may comprise a curved side wall which is arranged along a part of a first circle having a center point resembling the axis of rotation and wherein the protrusion comprises a curved side wall which is arranged along a part of a second circle having a center point resembling the axis of rotation, the curved side wall of the protrusion slidably contacting at least part of the curved side wall of the recess during rotation.

Alternatively or additionally, the first coupling member may comprise an extending pin or tube protruding from the first side of the first housing, and wherein the second coupling member comprises a central recess arranged at the first side of the second housing. The central recess is arranged to receive the pin or tube. Once the pin (or tube) is inserted into the recess, it can be used as a physical rotational axis at the same time prohibiting a translation. This will facilitate the manual coupling. Alternatively, the second coupling member may comprise an extending pin or tube protruding from the first side of the second housing. In that case the first coupling member will have a central recess for receiving the pin or tube.

Optionally the first and the second housing are substantially box-shaped and wherein once the first coupling member is fully coupled to the second coupling member, the first and second coupling member align their shapes to form a substantially box-shaped assembly.

One of the first and second coupling member may be a network termination unit and the other of the first and second coupling member may be a fiber termination unit. It is noted that the specific coupling may be used for other purposes such as connecting electronic equipment.

Optionally the second optical connector is rotatably arranged in the second housing. By being able to rotate, the second optical connector can be adjusted once the first optical connector enters the second optical connector for mating. This is advantageous if the first optical connector is fixed onto the first coupling member thereby making a rotational movement during coupling. The first optical connector may a male type connector and the second optical connector may be a female type connector. Of course the female and male roles may be switched, furthermore, the connectors may both be male type being connected via an adapter arranged to receive both connectors form different sides.

It is noted that the first optical connector could alternatively or additionally rotate, e.g. when a male connector is arranged in the second coupling member and a female connector arranged in the first coupling member.

The second housing may comprise a spring which is arranged to force the second optical connector in a first orientation in which the first optical connector can mate with the second optical connector, and to allow the second optical connector to rotate to a second orientation when forced by the first optical connector during mating. The spring may be partly or fully unloaded if the second optical connector is in the first orientation (i.e. when the coupling members are uncoupled). The spring may be (further) loaded after coupling of the members wherein the second optical connector is pressed/force into the second orientation during mating. On decoupling the two coupling members, the spring will unload and will press the second optical connector back in first orientation. It is noted that instead making the second optical connector rotatable, the first optical connector (i.e. the connector inside the protrusion of the first coupling member) may be rotatable and optionally be coupled to a spring to accomplish the wanted orientations described above.

Some embodiments also relate to a coupling member for use in an assembly as described above.

According to an embodiment, the coupling member is a fiber termination unit for connecting an optical fiber to a network termination unit, the fiber termination unit comprising an optical connector arranged inside the fiber termination unit and an optical fiber with a first outer end connected to the optical connector, wherein the optical fiber has a surplus of length which can be pulled out of the fiber termination unit from a second outer end of the optical fiber for connection to a remote connection point, such as a further fiber termination unit. Optionally, the optical fiber can be equipped with an optical connector at the second outer end. Alternatively, the optical fiber could be spliced to a remote connection point, eliminating the need for a connector.

These and other aspects of some of the embodiments are apparent from and will be elucidated with reference to the embodiments described hereinafter.

DETAILED DESCRIPTION OF THE EMBODIMENTS

Figure 1:
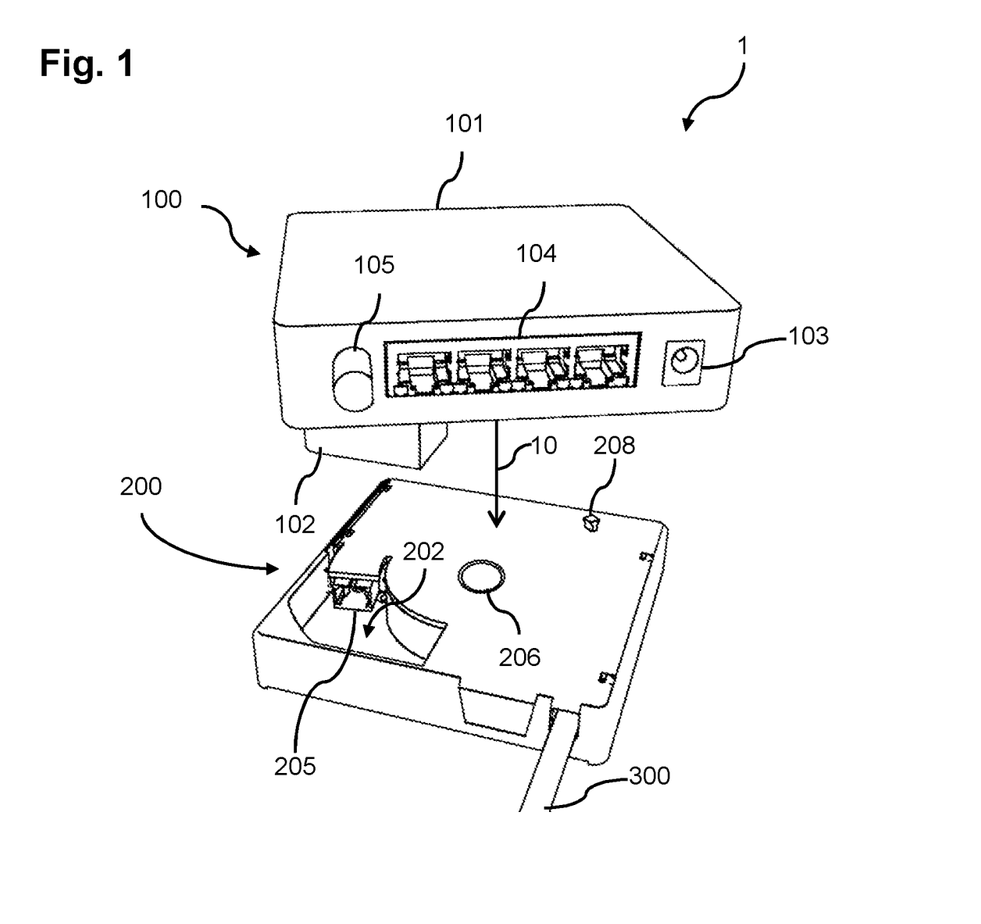
FIG. 1 shows a perspective view of a fiber connection assembly according to an embodiment.

FIG. 1 shows a perspective view of a fiber connection assembly 1 according to an embodiment. The fiber connection assembly 1 comprises a first coupling member 100 and a second coupling member 200. The first coupling member 100 comprising a first housing 101, a protrusion 102 protruding from a first side (in FIG. 1 the bottom side) of the first housing 101, and a first optical connector (not visible) arranged in the protrusion 102. In this example the first coupling member 100 is a modem 100 (also referred to a Network Termination Unit 100) which further comprises a power input 103, a number of UTP connections 104, a cable television connector 105 and electronics (not visible). The actual connectors/functionality present in the NTU 100 could also additionally comprise wireless LAN, or any other wired or wireless media interface.

The second coupling member 200 comprising a second housing 201. A recess 202 is arranged at a first side (in FIG. 1 the top side) of the second housing 200. The recess 202 is arranged to receive the protrusion 102 of the first coupling member 100. The second coupling member also comprises a second optical connector 205 arranged in the second housing 200 in or next to the recess 202. At a side (i.e. the first side) facing the first coupling member 100, the second coupling member 200 comprises a flat wall having a central hole 206 giving access to a recess for receiving a pin or tube arranged at the first coupling member 100 (not visible in FIG. 1). In this embodiment, the second coupling member 200 further comprises a hook 208 which may cooperate with a curved groove (not visible) in a wall of the first coupling member 100. A protective cable 300 containing one or more optical fibers enters the second coupling member 200. The protective cable 300 may be a cable entering a house to deliver the so-called FttH services, such as broadband telecom services. For that reason, the second coupling member 200 is referred to as a Fiber Termination Unit 200 where optical fibers entering the house are terminated.

Figure 2:
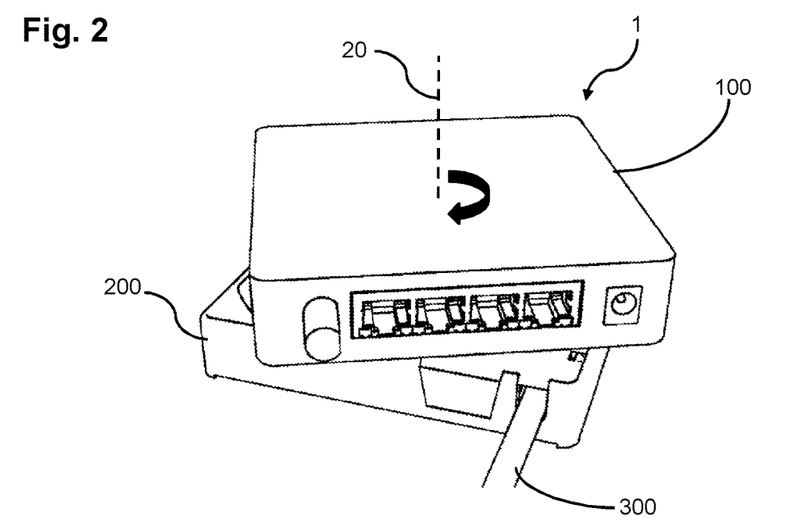
FIG. 2 shows a perspective view of the first and second coupling member in a semi-coupled state.

FIG. 1 shows the first and second coupling member 100, 200 in a non-coupled state. The first and second coupling member 100, 200 are arranged to be coupled to each other by way of moving the first coupling member 100 in a first direction, see arrow 10, towards and onto the second coupling member 200, thereby inserting the protrusion 102 into the recess 202. FIG. 2 shows a perspective view of the first and second coupling member 100, 200 in a semi-coupled state. The first coupling member 100 is placed onto the second coupling member 200 in slightly rotated way. In this rotated relative position, the protrusion 102 can be inserted into the recess 202. Due to the specific dimension and shape of the protrusion 102 and of the recess 202 in this embodiment, the protrusion 102 can only be inserted in one possible way into the recess 202. Due to the specific position of the protrusion on the first coupling member 100, the first coupling member 100 can only be placed onto the second coupling member 200 as shown in FIG. 2, i.e. in a slightly rotated way.

Once the first coupling member 100 is placed onto the second coupling member 200 as shown in FIG. 2, the first coupling member 100 can be rotated relative to the second coupling member 200 in a plane perpendicular to the first direction 10 and around a rotation axis 20, see FIG. 2, until the first optical connector inside the protrusion 102 is connected to the second optical connector 205 inside the second coupling member 200. The end result is shown in FIG. 3 which shows a perspective view of the assembly 1 in a fully coupled state.

Figure 3:
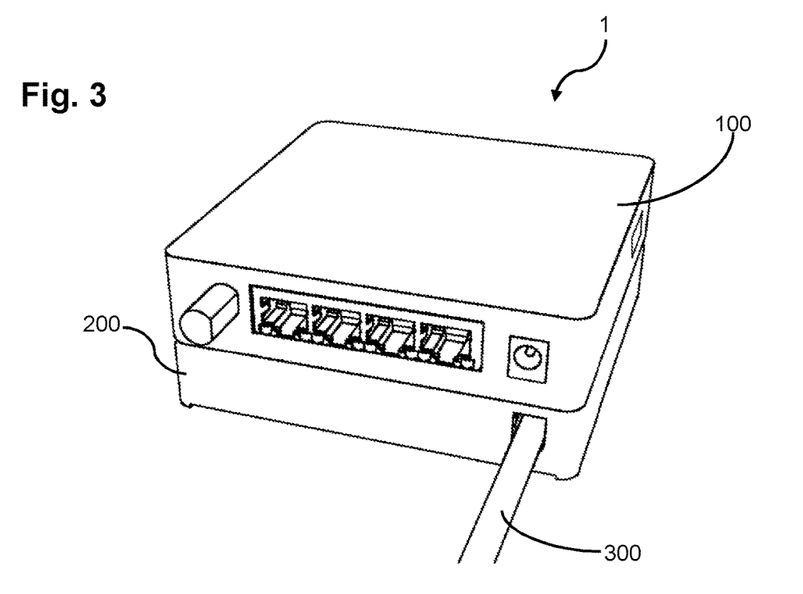
FIG. 3 shows a perspective view of the assembly of FIG. 2 in a fully coupled state.

In the embodiment shown in FIGS. 1-3, both the housing 101 of the first coupling member 100 and the housing 201 of the second coupling member 200 are substantially box-shaped. By rotating the first and second coupling member, the housings 101, 201 are aligned in such a way that a further box is created, as shown in FIG. 3.

It is noted that in the examples of FIGS. 1-3, the housings 101, 201 have rounded corners, but this is mainly an esthetic feature. The housing 101, 201 may have different shapes, they may even be cylindrical shaped although a cylindrical shape is less preferred. Preferably, the housings 101, 102 have such a shape that the user will notice that the housings are twisted relative to each other, and he will understand that the two housings need to be aligned. The first coupling member 100 may have a simple instruction printed on the top side, so as to instruct the user have to place the first coupling member and/or in which direction to rotate the first coupling member 100 relative to the second coupling member. If the second coupling member 200 is an FTU, it will mostly probably already be installed onto a wall by a professional. The end user then only needs to place the NTU (i.e. the first coupling member 100) onto the FTU 200 and rotate the NTU 100 until the user will feel a resistance or until the first and second coupling member 100, 200 are aligned, as will be discussed in further detail below.

Figure 4:
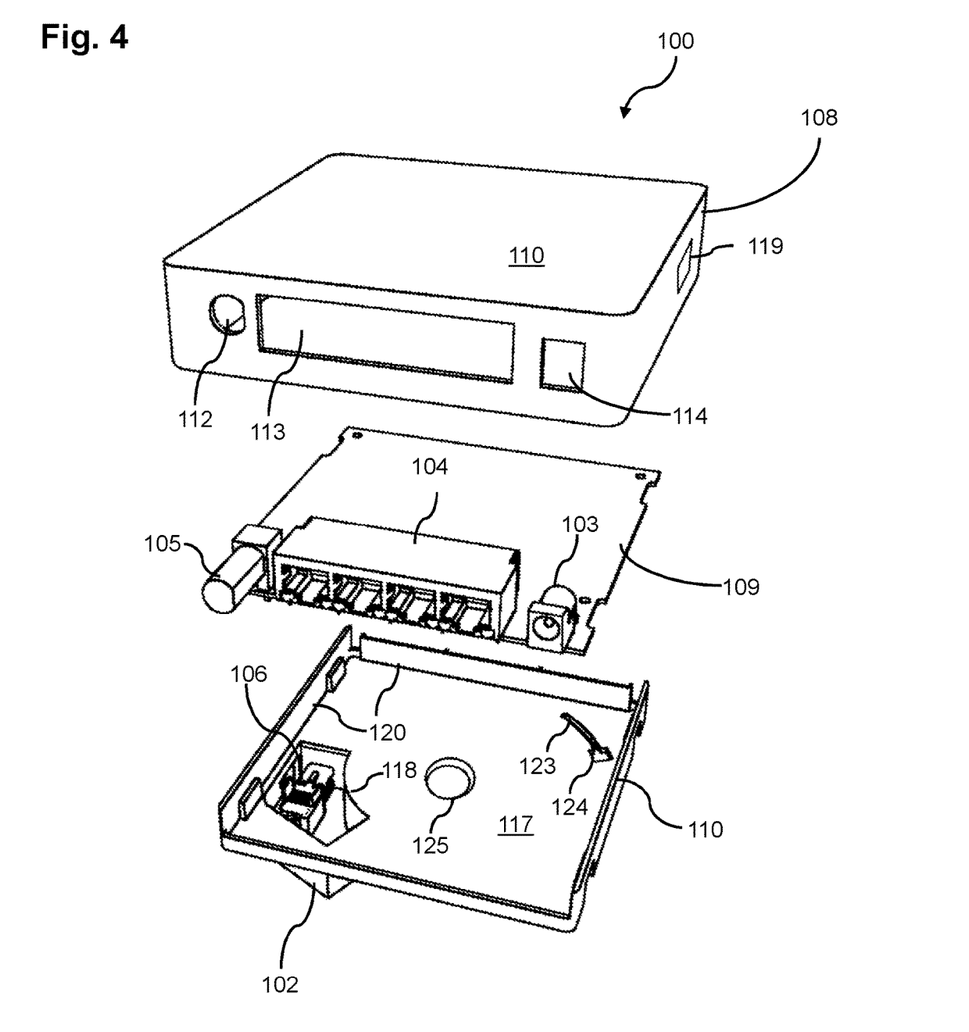
FIG. 4 shows an exploded view of the first coupling member according to an embodiment.

FIG. 4 shows an exploded view of the first coupling member 100 according to an embodiment. The first coupling member 100 may comprise a cap 108, a printed circuit board 109 and a bottom element 110. The cap 108 comprises a top wall 111 and three side walls. In one of the side walls three openings 112, 113, 114 are arranged to accommodate access to or for the cable television connector 105, the UTP connections 104 and the power input 103 respectively. As can be seen from FIG. 4, the cable television connector 105, the UTP connections 104 and the power input 103 are arranged on the printed circuit board 109. The printed circuit board 109 may be arranged to convert and/or process optical signals received by the first optical connector in a way known to one with ordinary skill in the art.

The bottom element 110 comprises a substantially square plate 117 having an opening 118 giving access to the inside of the protrusion 102 attached to the plate 117. In FIG. 4, the first optical connector 106 is shown being arranged in the protrusion 102. The protrusion 102 is a substantially hollow body providing sufficient space for the first optical connector 106. The bottom element 110 further comprises a number of side walls 120 extending from the plate 117 in a perpendicular way.

In this embodiment, a release button 119 is arranged at a wall of the coupling member 100 in order to allow demounting the NTU from the FTU. In the example of FIG. 4, the release button 119 is positioned on the right sidewall near the top (i.e. top side when fixed onto a wall). The release button 119 may be pushed by a user to unlock the NTU relative to the FTU so as to be able to rotate the NTU in an opposite rotational direction as compared to the direction used to couple the NTU to the FTU.

Not drawn in the drawings discussed above is an optical transceiver. This is the component that transmits and receives optical signals and converts these to/from electrical signals. The transceiver may be box shaped and mounted on the PCB 109. A transceiver can be equipped with a fiber pigtail attached to it, of which the optical connector 106 is placed in the protrusion 102. A transceiver can also be equipped with a fiber receptacle (female connector), which could also directly be aligned in the protrusion 102.

The bottom element 110 comprises a curved slit 123 and a hole 124 at an outer end of the curved slit 123. The hole 124 is configured and arranged to receive the hook 208 of the second coupling member 200, see also FIG. 1.

Figure 5:
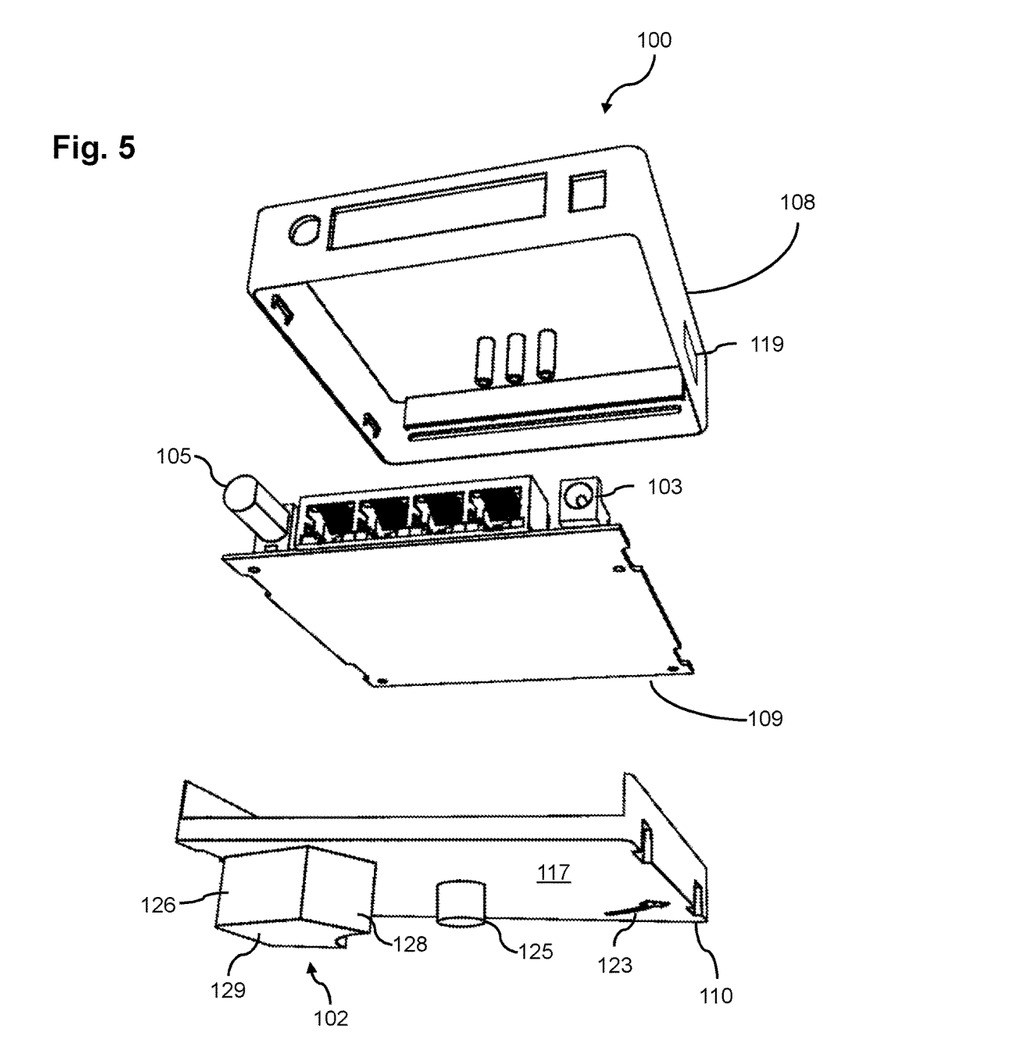
FIG. 5 shows an exploded view of the first coupling member according to the embodiment of FIG. 4 but from another angle.

FIG. 5 shows an exploded view of the first coupling member 100 according to the embodiment of FIG. 4 but from another angle such as to show the opposing sides of the elements 108, 109, 110 as compared to FIG. 4. As can be seen from FIG. 5, the protrusion 102 is attached to the bottom element 110. The protrusion 102 has a curved beam shape comprising six sides. Two of these six sides are open, being the side lying in a plane of the plate 117 and the side which enables the first optical connector 106 to make connection to the second optical connector 205 (both not visible in FIG. 5). The other four sides are formed by walls being a curved outer side wall 126, a curved inner side wall 127, a flat rectangular side wall 128 and a flat bottom wall 129. Seen from above, the protrusion 102 has a cross section having a circumference which has two curved parts and two straight parts. In this embodiment, the first coupling member 100 also comprises a pin 125 (or tube) arranged at the bottom side of the 110 at a central location. The pin 125 can be inserted into the hole 260 at the same time the protrusion 102 is inserted into the recess 202. The length of the pin may be different from that of the protrusion 102. Having a central physical rotation axis (i.e. the pin or tube 125) will facilitate the rotation of the first coupling member 100 relative to the second coupling member 200. It is noted that instead of being arrange on the first coupling member 100 which comprises the protrusion, the pin 125 may alternatively be arrange on the second coupling member. In that case the first coupling member will have a central hole (or recess) receiving the pin when coupling the coupling members.

Figure 6:
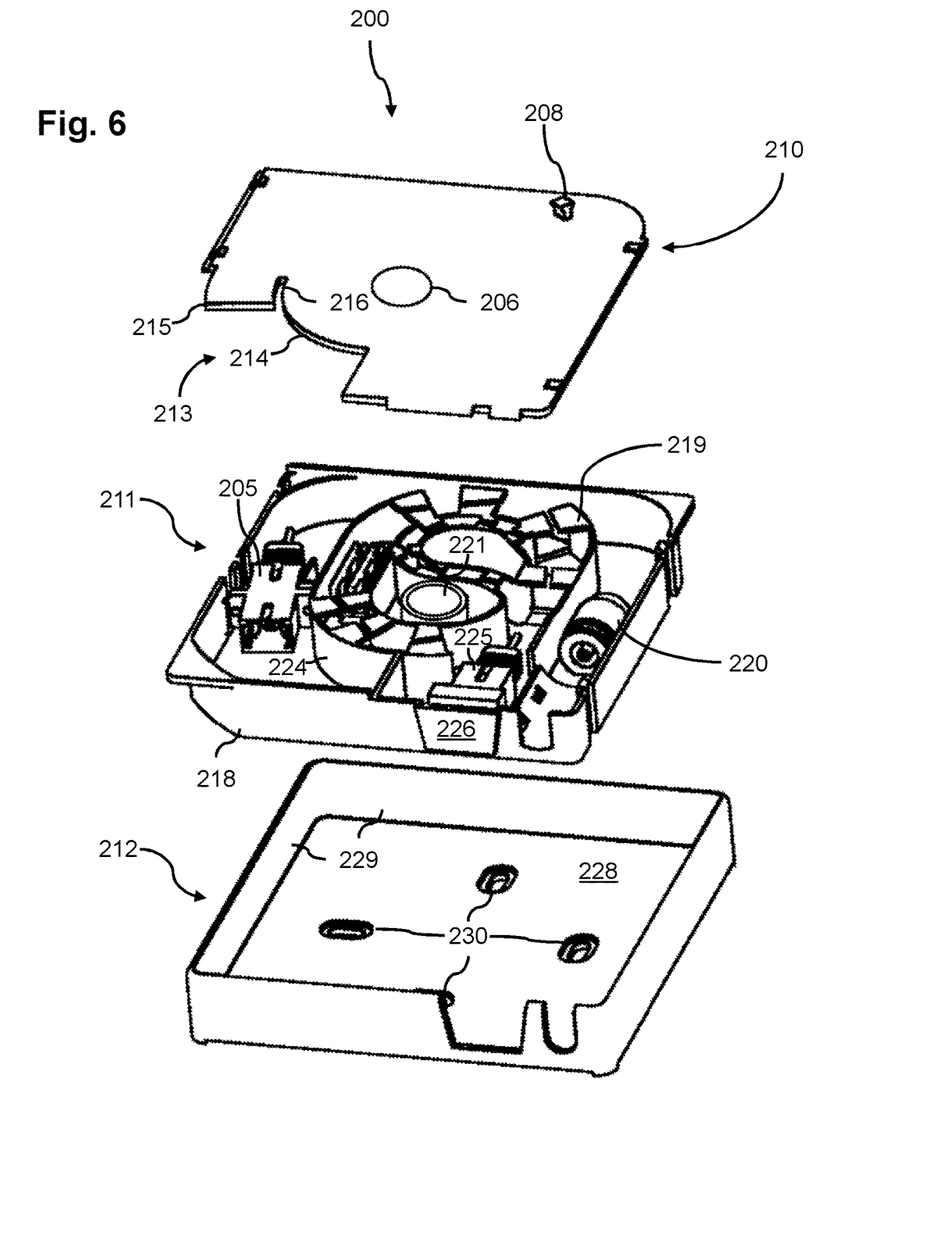
FIG. 6 shows an exploded view of the second coupling member according to an embodiment.

FIG. 6 shows an exploded view of the second coupling member 200 according to an embodiment. The second coupling member 200 comprises a top plate 210, a fiber handling structure 211 and a cap 212. The top plate 210 comprises the central hole 206. The hook 208 is attached to the top plate 210.

The top plate 210 is a substantially rectangular plate having rounded corners and a cut-out 213 at one of the corners. The cut-out 213 is shaped such as to create a rounded edge 214, and a curved lip 215. The rounded edge 214 follows a circle having its center at the center of the opening 206. The rounded edge 214 extends further then the outer end of the lip 215 so that a slit 216 between the rounded edge 214 and the lip 215 is created.

The fiber handling structure 211 comprises four outer side walls 218 enclosing a fiber containment structure 219. The fiber handling structure 211 further comprises a gas block connector (optional) 220 arranged in a channel between the outer side walls 218 and the fiber containment structure 219. The fiber handling structure 211 also comprises a tube 221 at a central part of the fiber handling structure 211. The second optical connector 205 is arranged between one of the side walls 218 and the fiber containment structure 219. In a preferred embodiment, the second optical fiber connector 205 is rotatable so that its orientation is adjusted during entering of the first optical connector 106. The second optical fiber connector 205 may be spring biased so that its orientation returns back to a default orientation once the first and second optical connector are disconnected.

At an interior of the fiber handling structure 211 a curved wall 224 is arranged which is aligned with the curved edge 214 of the plate 210 in the assembled state. In this example a further connector 225 is arranged in the fiber handling structure for connection of the fiber to another module. A lid 226 is shielding the access to the further connector 225.

The cap 212 comprises a bottom plate 228 and four side walls 229 perpendicular to the bottom plate 228. In the bottom plate 228 four holes 230 are arranged for insertion of screws to connect the second coupling member 200 to a wall.

Figure 7:
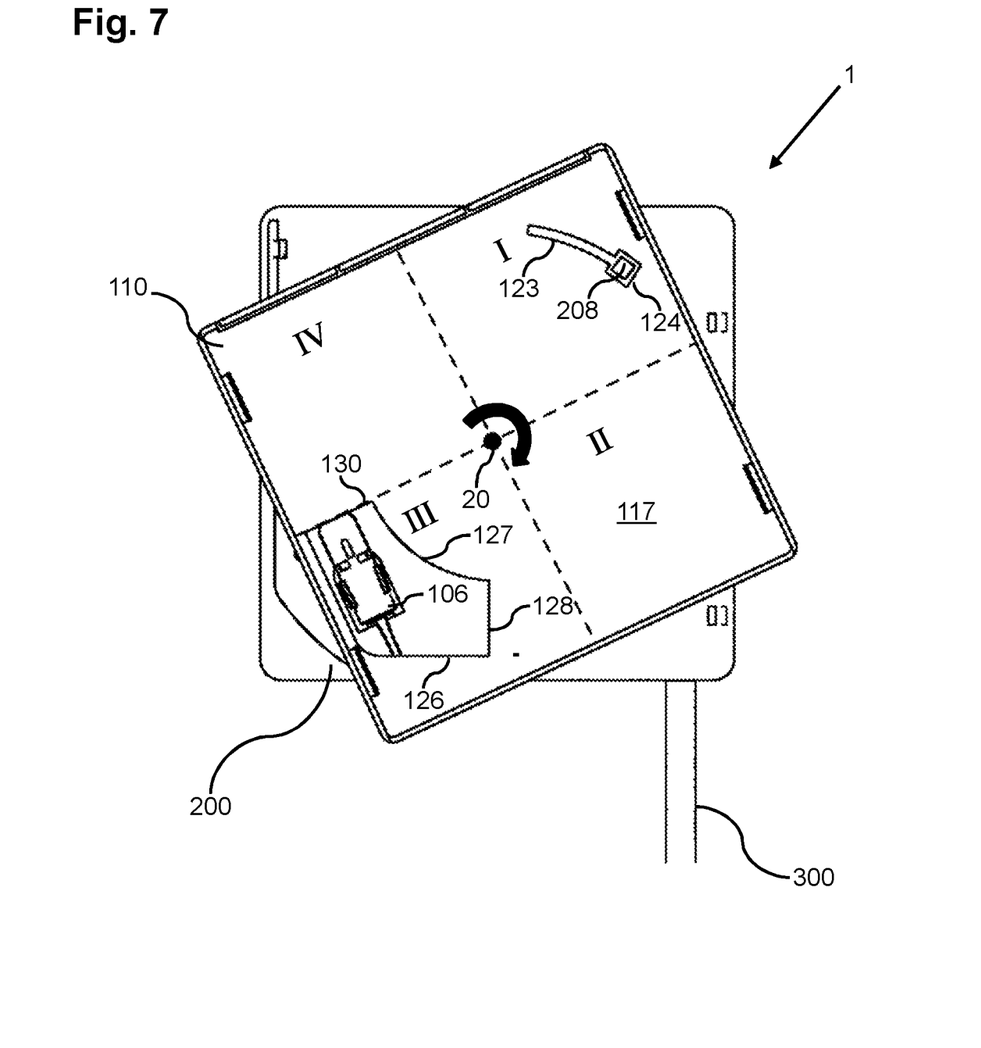
FIG. 7 is a top view of the assembly showing only the bottom element of the first coupling member.

FIG. 7 is a top view of the assembly 1 showing only the bottom element 110 of the first coupling member 100. The cap 108 and the printed circuit board 109 are left out so that this top view shows the first optical connector 106 in the protrusion of the first coupling member 100. It is noted that in the semi-coupled state the first optical connector lies in the same level as the second optical connector (not visible in FIG. 7).

In this example both the first coupling member 100 and the second coupling member 200 have a square cross section. In this case, the rotation axis 20 lies exactly in the center of the plate 117. In FIG. 7 four quadrants are indicated, see quadrant I, II, III and IV having the rotation axis 20 as the origin. In quadrant I the curved slit 123 is arranged while in quadrant III (the opening to) the protrusion is arranged. In the semi-coupled state the hook 208 of the second coupling member 200 is positioned in the hole 124.

FIG. 7 shows three walls of the protrusion, see wall 126, 127 and 128. It also indicates the open side 130 enabling contact between the first and second optical connector.

Figure 8:
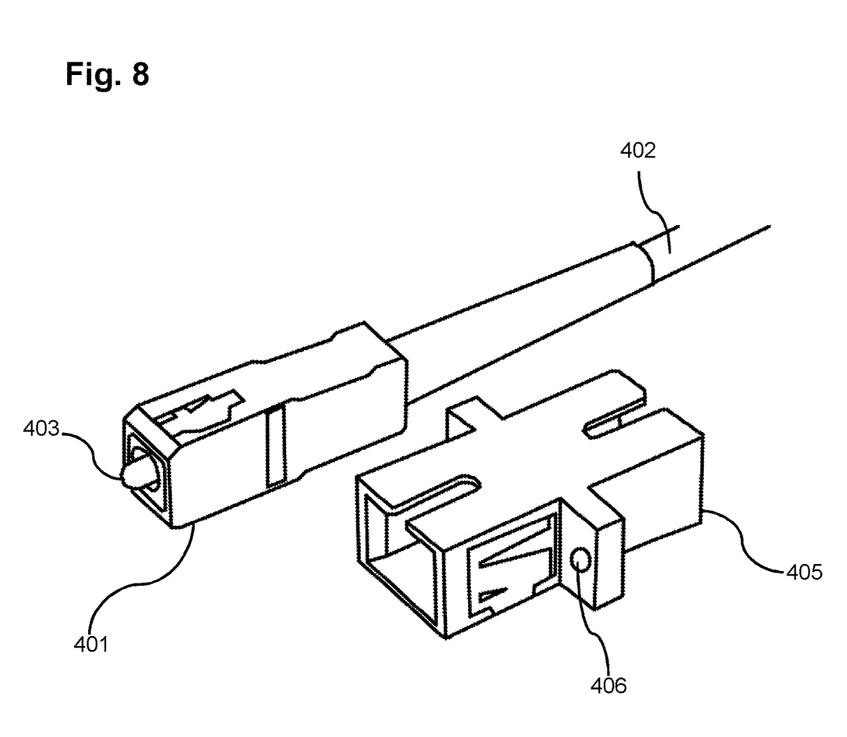
FIG. 8 is a perspective view of a connector arranged at an outer end of an optical fiber.

In an embodiment, the first optical connector 106 is a male type connector and the second optical connector 205 is a female type connector. In that way the first optical connector 106 can be inserted into the second optical connector 205 for obtaining on optical connection between the first and second coupling member 100, 200. Instead of using a typical male and female connector, a special adapter can be used to connect two connectors. FIG. 8 is a perspective view of a connector 401 arranged at an outer end of an optical fiber 402. A tip 403 of the fiber slightly extends from the connector 401. Next to the optical connector 401 an adapter 405 is shown. The adapter 405 is arranged to receive a connector like the connector 401 from both sides. In this way a connection between to identical connectors can be established. FIG. 8 shows that in this example the adapter 405 comprises two extensions with a hole, one of which is visible, see 406. The hole can be used to mount the adapter into the second coupling member 200 by means of a bolt or by means of a spring if the connector is spring biased, such as in case of the second optical connector 205.

Figure 12:
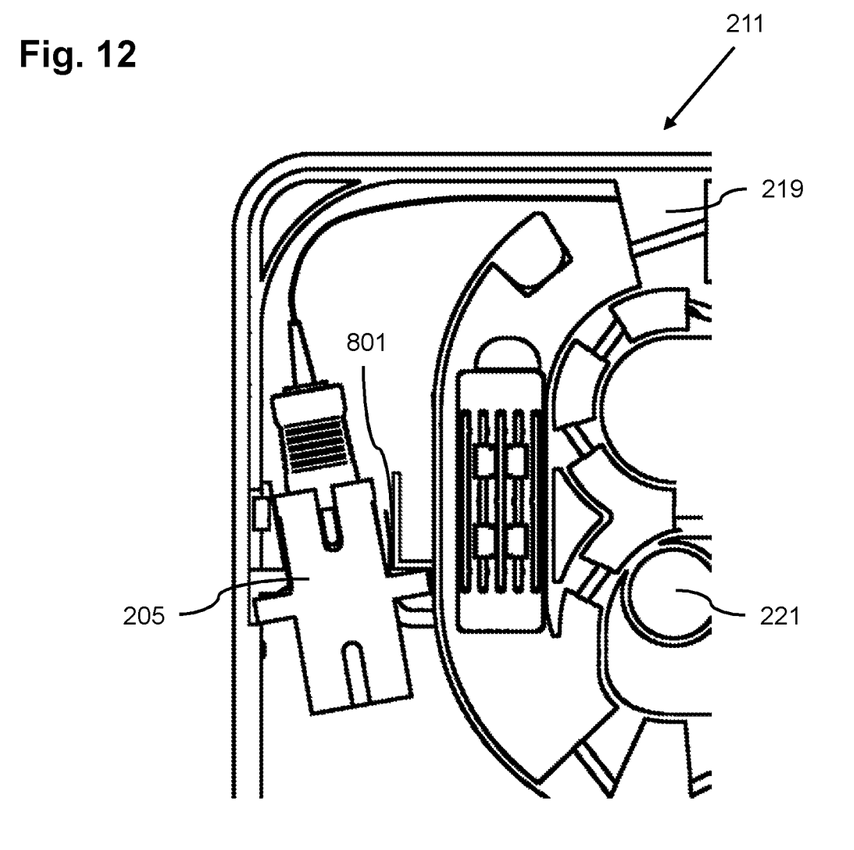

FIG. 12 schematically shows an example of a part of the fiber handling structure 211 of the second coupling member 200 in which the second optical connector 205 is rotatably arranged. The second optical connector 205 is forced by a leaf spring 801 so as to be orientated in the correct position when mating with a male connector of the first coupling member (not shown). It is noted that instead of using a leaf spring other types of springs may be used, such as helical springs.

Figure 9:
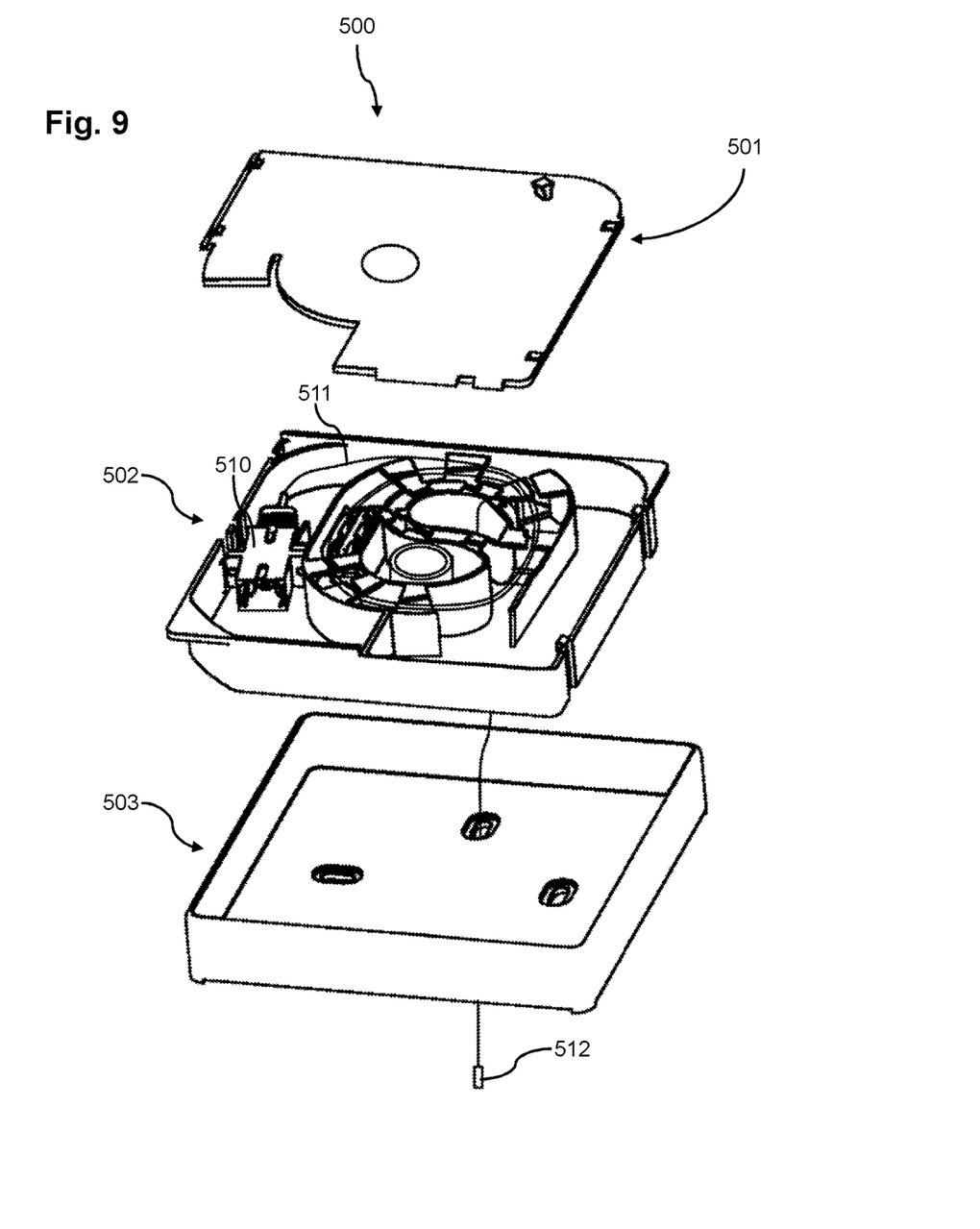
FIG. 9 shows an exploded view of a fiber termination unit for connecting an optical fiber to a network termination unit (not shown)

FIG. 9 shows an exploded view of a fiber termination unit 500 for connecting an optical fiber to a network termination unit (not shown). In this embodiment the fiber termination unit 500 comprises a top plate 501, a fiber handling structure 502 and a cap 503. The fiber termination unit 500 comprises an optical connector 510 arranged inside the fiber termination unit 500 and an optical fiber 511 connected at a first end to the optical connector 510. At a second end the fiber 511 is connected to a further optical connector 512, which may be a smaller connector as compared to the optical connector 510. It may also just be a fiber-optic ferrule, which contains the actual fiber. From the ferrule an optical connector can be build.

The optical fiber 511 has a surplus of length which can be pulled out of the fiber termination unit 500 from the second end of the fiber 511 for connection of the second optical connector 512 to a remote connection point, such as a further fiber termination unit (not shown in FIG. 9).

Figure 10:
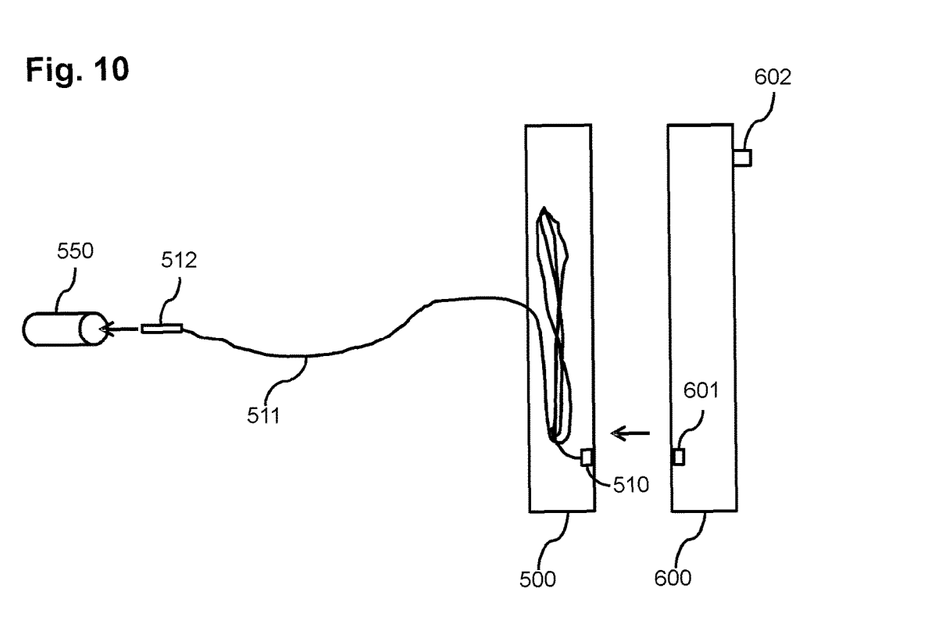
FIG. 10 schematically shows a side view of the fiber termination unit of FIG. 9 together with a network termination unit.

FIG. 10 schematically shows a side view of the fiber termination unit 500 of FIG. 9 together with a network termination unit 600. In this example a certain length of the optical fiber 511 is pulled out of the fiber termination unit 500. The optical fiber 511 can be inserted into a tube which may be a tube of a infrastructure of a house. Normally such tubes are used to guide the electrical wires for powering lamps and other electrical equipment, however these tubes may also be used to guide the optical fiber 511 to another room or part of the house such as the basement. There are no restrictions to do this when using optical fiber, since optical signals do not generate electro-magnetic interference that can cause distortion, like electrical signals do. Optionally, the optical fiber 511 can be equipped with an optical connector 512 at the outer end that is pulled out of the fiber termination unit 500.

The network termination unit 600 may comprise an optical connector 601 for interacting with a connector 510 in the fiber termination unit 500. The network termination unit 600 may also comprise an antenna 602 for wireless communication with devices. Coupling between the fiber termination unit 500 and the network termination unit 600 may be similar to the type described above with reference to FIGS. 1-7, but other way of coupling may be conceivable.

In a traditional FTTH roll-out, a skilled installer will install a cable containing the optical fiber(s) in the home. The cable must be brought from the outside to the inside of the home, and a choice must be made for the location of entry. Often the cable is considered "ugly" for indoors use, and therefore the cable must be terminated at or near the location of entry, thereby limiting the length of "ugly" cable running through the home. Alternatively, the cable can enter the home in the basement, or metering cabinet, garage or such. Here the "ugliness" of the installation is less important, but now the location is not ideal for connecting the NTU. For instance, if the NTU contains also a Resident Gateway with wireless LAN capability, locating it in the basement would have negative effects on having a good wireless connectivity in the home.

Figure 11:
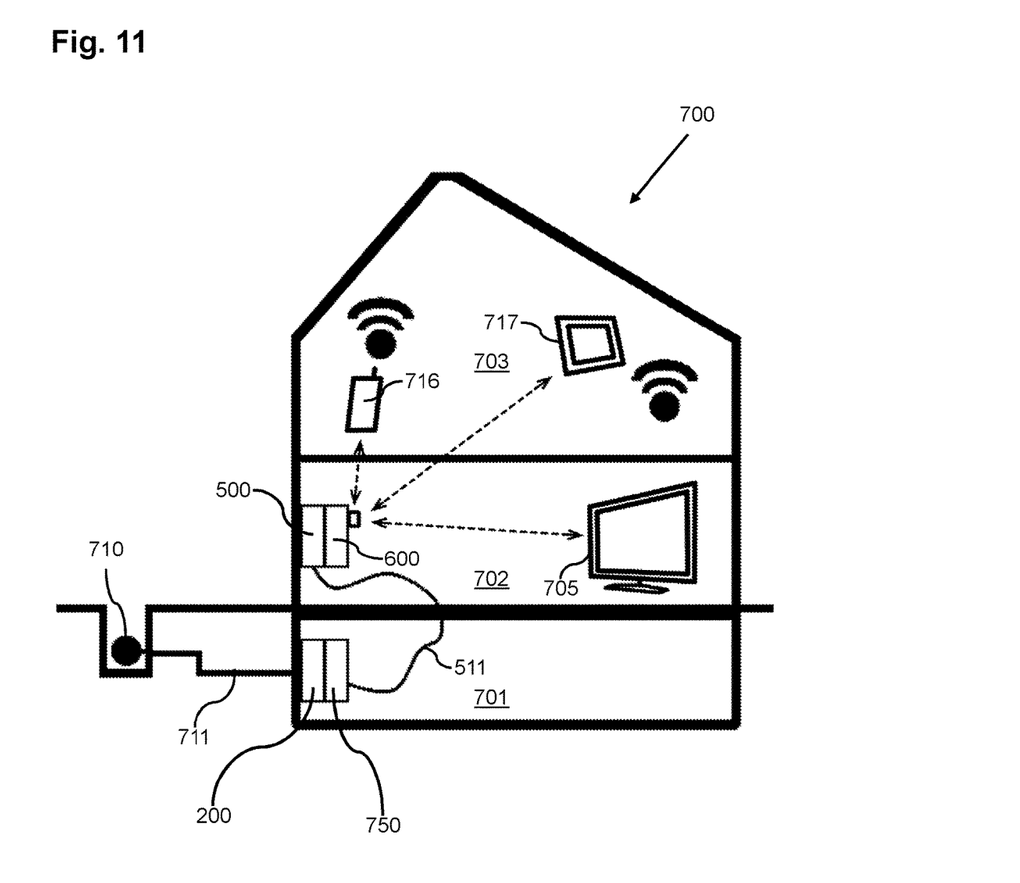
FIG. 11 shows an example explaining how the fiber termination unit can favorably be used, and FIG. 12 schematically shows an example of a part of the fiber handling structure of the second coupling member in which the second optical connector is rotatably arranged.

FIG. 11 shows an example explaining how the fiber termination unit 500 can favorably be used. FIG. 11 schematically shows a house 700 having a basement 701, a living room 702 and a sleeping room 703, each being on different floors of the house.

FIG. 11 also shows a connection point 710 of a fiber network located underground in front of the house 700. When installing FTTH the installer will bring a fiber 711 from the connection point 700 to the house. Next, a FTU is installed. In this example the FTU is installed in the basement 701. The FTU may be similar to the coupling member 200 shown in FIG. 6.

Once the FTU 200 is installed, the user himself can install the in-house part of the network. He can install the FTU 500 at the living room 702 and couple the NTU 600 on the FTU 500. Now the NTU 600 is at an optimal place for wireless communication to the electrical devices such as a television 715, a mobile phone 716 and/or a tablet 717 which may even be used at different floors. A sufficient length of the optical fiber 511 can be pulled out of the FTU 500 and be guided (e.g. via the tubing of the house) to the basement 701 where it is connected directly to the FTU 200, e.g. to the optical connector 225 once the lid 226 has been removed.

Alternatively, a specially designed, so-called dummy Network Termination Unit (750) containing a cable connection for receiving the optical connector 512, can be coupled on top of the FTU 200. Having a click-on mechanism and a patch-through mechanism which is very simple, allows for locating the NTU 600 in the most optimum place. If the FTU 200 is in the basement 701, the NTU 600 can be located elsewhere using patch through. If the FTU 200 is in the living room, the NTU 600 can be located on top of the FTU using click-on. If the FTU is in a metering cabinet, either one of the solutions can be adapted.

It should be noted that the above-mentioned embodiments illustrate rather than limit some of the embodiments, and those with ordinary skill in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A fiber connection assembly, comprising:
   a first coupling member including a first housing, a protrusion protruding from a first wall of the first housing, and a first optical connector arranged in the protrusion;
   a second coupling member comprising including a second housing, a recess arranged in a first wall of the second housing and a second optical connector arranged in the second housing in or next to the recess,
   the first and second coupling member being configured to be coupled to each other by way of:
      moving the first coupling member relative to the second coupling member in a first direction towards and onto the second coupling member, thereby inserting the protrusion into the recess, and then
      rotating the first coupling member relative to the second coupling member in a plane perpendicular to the first direction and around a rotation axis until the first optical connector is connected to the second optical connector,
   wherein at least one of first and second optical connector is rotatably arranged in its associated housing around a rotational axis parallel to the first direction, so as to enable alignment of the second optical connector relative to the first optical connector during mating.

2. The fiber connection assembly according to claim 1, wherein the protrusion and the recess are dimensioned and shaped such that the protrusion can only be inserted in one possible way into the recess.

3. The fiber connection assembly according to claim 1, wherein once the protrusion is inserted into the recess, the first coupling member and the second coupling member can be rotated but not translated relative to each other in the plane perpendicular to the first direction.

4. The fiber connection assembly according to claim 1, wherein the recess includes a curved side wall arranged along a part of a first circle having a center point resembling the axis of rotation, and wherein the protrusion includes a curved side wall arranged along a part of a second circle having a center point resembling the axis of rotation, the curved side wall of the protrusion slidably contacting at least part of the curved side wall of the recess during rotation.

5. The fiber connection assembly according to claim 1, wherein the first coupling member includes an extending pin or tube protruding from the first wall of the first housing, and wherein the second coupling member comprises a central recess arranged at the first wall of the second housing, the central recess being arranged to receive the pin or tube.

6. The connection assembly according to claim 1, wherein the second coupling member includes an extending pin or tube protruding from the first wall of the second housing.

7. The fiber connection assembly according to claim 1, wherein the first and the second housing are substantially box-shaped and wherein once the first coupling member is fully coupled to the second coupling member, the first and second coupling member align their shapes to form a substantially box-shaped assembly.

8. The fiber connection assembly according to claim 1, wherein one of the first and second coupling member is a network termination unit and the other of the first and second coupling member is a fiber termination unit.

9. The fiber connection assembly according to claim 1, wherein the second housing includes a spring arranged to force the second optical connector in a first orientation in which the first optical connector can mate with the second optical connector, and to allow the second optical connector to rotate to a second orientation when forced by the first optical connector during mating.

10. The fiber connection assembly according to claim 1, wherein the first optical connector is a male type connector, and the second optical connector is a female type connector.

11. A first coupling member for use with a second coupling member and forming therewith a fiber connection assembly, the second coupling member including a second housing, a recess arranged at a first wall of the second housing and a second optical connector arranged in the second housing in or next to the recess, the first coupling member comprising:
a first housing;
a protrusion protruding from a first wall of the first housing; and
a first optical connector arranged in the protrusion;
wherein the first coupling member is arranged to be coupled to the second coupling member by moving the first coupling member relative to the second coupling member in a first direction towards and onto the second coupling member, thereby inserting the protrusion into the recess, and then by rotating the first coupling member relative to the second coupling member in a plane perpendicular to the first direction and around a rotation axis until the first optical connector is connected to the second optical connector wherein at least one of the first and second optical connector is rotatably arranged in its associated housing around a rotational axis parallel to the first direction, so as to enable alignment of the second optical connector relative to the first optical connector during mating.

12. The first coupling member according to claim 11, wherein the first coupling member is a fiber termination unit for connecting an optical fiber to a network termination unit, the fiber termination unit including an optical connector arranged inside the fiber termination unit and an optical fiber with a first outer end connected to the optical connector, wherein the optical fiber has a surplus of length which can be pulled out of the fiber termination unit from a second outer end of the optical fiber for connection to a remote connection point, such as a further fiber termination unit.

* * * * *